United States Patent [19]

Uozumi

[11] Patent Number: 4,564,099

[45] Date of Patent: Jan. 14, 1986

[54] SAFETY DEVICE FOR A PASSENGER CONVEYOR

[75] Inventor: Akira Uozumi, Ichinomiya, Japan

[73] Assignee: Mitsubishi Denki Kabushiki Kaisha, Tokyo, Japan

[21] Appl. No.: 557,363

[22] Filed: Dec. 2, 1983

[30] Foreign Application Priority Data

Jan. 25, 1983 [JP] Japan .................................. 58-10126

[51] Int. Cl.[4] .............................................. B65G 43/00

[52] U.S. Cl. .................................... 198/323; 198/336; 198/810; 198/814

[58] Field of Search ............... 198/323, 336, 335, 337, 198/810, 814; 474/117

[56] References Cited

U.S. PATENT DOCUMENTS 2,929,483 3/1960 Jin ...................................... 198/336
3,580,376 5/1971 Loshbough ......................... 198/323
3,651,919 3/1972 Vollmer ............................. 198/336
3,712,447 1/1973 Boltrek et al. ...................... 198/335

FOREIGN PATENT DOCUMENTS 135084 10/1980 Japan .
3175 1/1981 Japan .

*Primary Examiner*—Joseph E. Valenza
*Assistant Examiner*—Kyle E. Shane
*Attorney, Agent, or Firm*—Wenderoth, Lind & Ponack

[57] ABSTRACT

A safety device for a passenger conveyor is disclosed which comprises a thrust means having a support rod shiftably held by a stationary part and having a roller rotatably mounted at the forward end of the support rod so as to abut against the handrail of the conveyor, a tension application means to apply tension to the handrail through the roller of the support rod, an actuating means provided at the base end portion of the support rod, and a detecting means to detect the shift of the support rod through the actuating means.

3 Claims, 4 Drawing Figures

SAFETY DEVICE FOR A PASSENGER CONVEYOR

BACKGROUND OF THE INVENTION

The present invention relates to a passenger conveyor and more particularly to a safety device for a passenger conveyor which operates to issue an alarm or to stop the operation of the conveyor when there arises any deviation between the speed of the tread boards on which the passenger rides and the speed of the handrails of the conveyor.

First, an example of the hitherto publicly known safety devices of this kind will be explained. Japanese Laid-Open Patent Publication No. 135084 discloses a safety device as illustrated in FIG. 1 of the accompanying drawings wherein the main frame 1 of a passenger conveyor is provided at its upper and lower end portions with a driving means 2 and a tension means 3, respectively, and endless tread board chains 4 are reeved on the sprockets mounted on the driving means 2 and the tension means 3, respectively. A number of tread boards 5 are continuously pivotally connected to the endless tread board chains 4, and endless handrails 6 are arranged along the tread boards 5 so as to be circulatingly driven. The handrail 6 is driven by driving pulleys 7 which are in contact therewith, thrust rollers 8 to thrust up the handrail 7, a transmission roller 10 driven by the driving means 2 through an endless handrail driving chain 9, and endless belts 11 reeved on the transmission roller 10 and the driving pulleys 7. In FIG. 1, the reference numeral 12 designates a tension means to apply tension to the handrail 6, 13 designates a velocity detector in contact with the handrail 6 to detect its velocity, and 14 designates a velocity detector mounted on the driving means 2 to detect the velocity of the tread boards 5.

The purpose of these detectors 13 and 14 is as follows.

In a passenger conveyor, in order to ensure the safety of the passenger, it is necessary to synchronize the speeds of the tread boards 5 and the handrails 6, but although the speed of the tread boards 5 is kept constant, the speed of the handrails 6 has a tendency to be gradually decreased due to a decrease in friction between the driving pulleys 7 and/or elongation of the handrails 6, since the latter are driven by frictional contact with the driving pulleys 7. Therefore, the velocities of the tread boards 5 and the handrails 6 are continuously detected by the detectors 14 and 13, respectively, and upon detection of any difference in the velocities, an alarm is issued or the passenger conveyor is caused to be stopped.

However, as will be understood from the above explanation, in this example of a conventional safety device, since the velocities of the tread boards 5 and the handrails 6 are separately detected by the detectors 14 and 13, respectively, and since they have to be compared with each other, in addition to the velocity detectors a comparison device to compare the two velocities is necessary, making the arrangement complicated.

Further, since the velocity detector 13 to detect the velocity of the handrails 6 detects the velocity by the rate of rotation of a roller which is in frictional contact with the handrails 6, there can arise a change in the rate of rotation of the roller due to any decrease in the frictional force between them, preventing the detection of the correct velocity.

Although a lag in the velocity of the handrails 6 relative to the velocity of the tread boards 5 is to some extent permissible, in the conventional safety device as above exemplified the comparison of the difference in the two velocities with a predetermined permissible velocity difference is difficult. As a result, there arise troubles such as the safety device being actuated even when the velocity difference is still within the predetermined permissible difference.

As another example of a safety device for a passenger conveyor, Japanese Laid-Open Utility Model Publication No. 3175/1981 discloses one wherein separate idle rollers are provided so as to be in contact with the handrails as well as with the handrail driving rollers and the difference in the speeds of the idle rollers is detected by a mechanical mechanism.

However, it will be apparent that this safety device has defects similar to those possessed by the first example.

SUMMARY OF THE INVENTION

It is a principal object of the present invention to provide a safety device for a passenger conveyor which can eliminate all of the defects in the conventional safety devices described above.

It is another object of the present invention to provide a safety device for a passenger conveyor which can detect a lag in the speed of the handrails of the passenger conveyor with respect to that of the tread boards thereof by the detection of a change in tension in the handrails.

It is a further object of the present invention to provide a safety device for a passenger conveyor which can serve simultaneously as a tension mechanism for the handrails of the passenger conveyor, simplifying the arrangement of the passenger conveyor.

In accordance with the present invention a safety device for a passenger conveyor is provided which comprises a thrust means shiftably held by a stationary member, the thrust means having its forward end adapted to be able to abut against the handrail, a tension application means to apply tension to the handrail through the thrust means, and a detecting means to detect the shift of the thrust means.

BRIEF DESCRIPTION OF THE DRAWINGS

These and other objects of the present invention will become more readily apparent upon reading the following specification and upon reference to the accompanying drawings, in which.

DESCRIPTION OF THE PREFERRED EMBODIMENT

Figure 1:
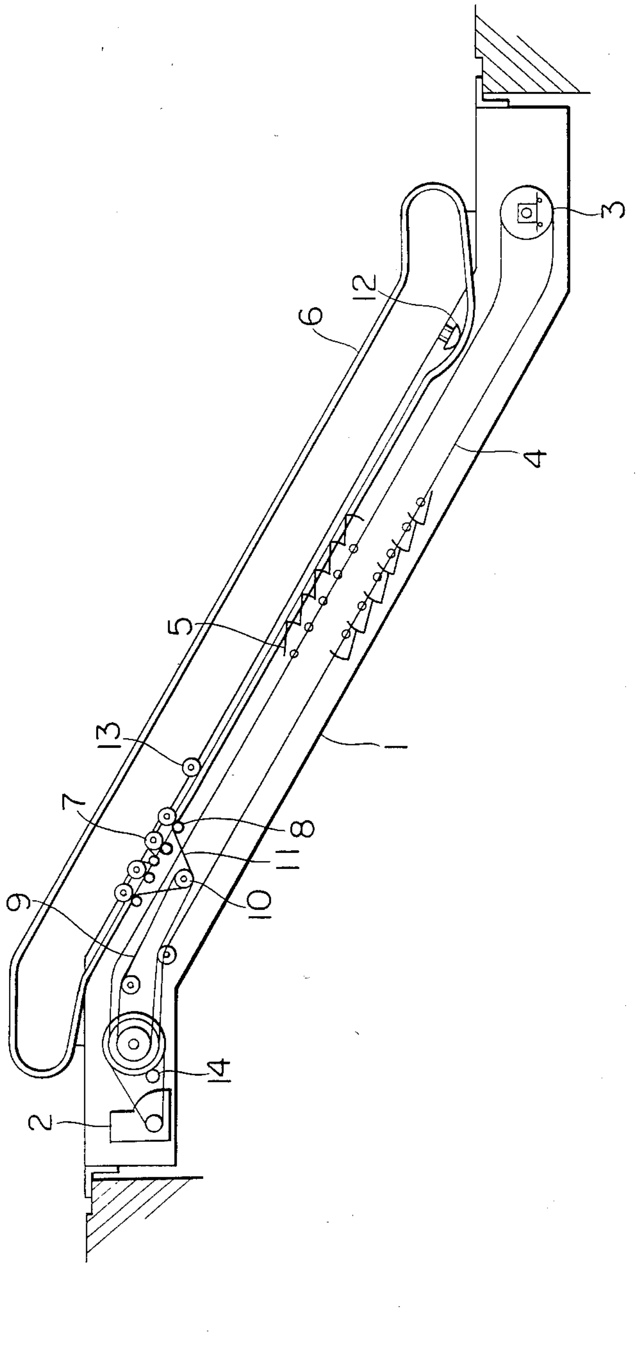
FIG. 1 PRIOR ART
FIG. 1 is a schematic side elevation of an example of a conventional safety device for a passenger conveyor.
Figure 2:
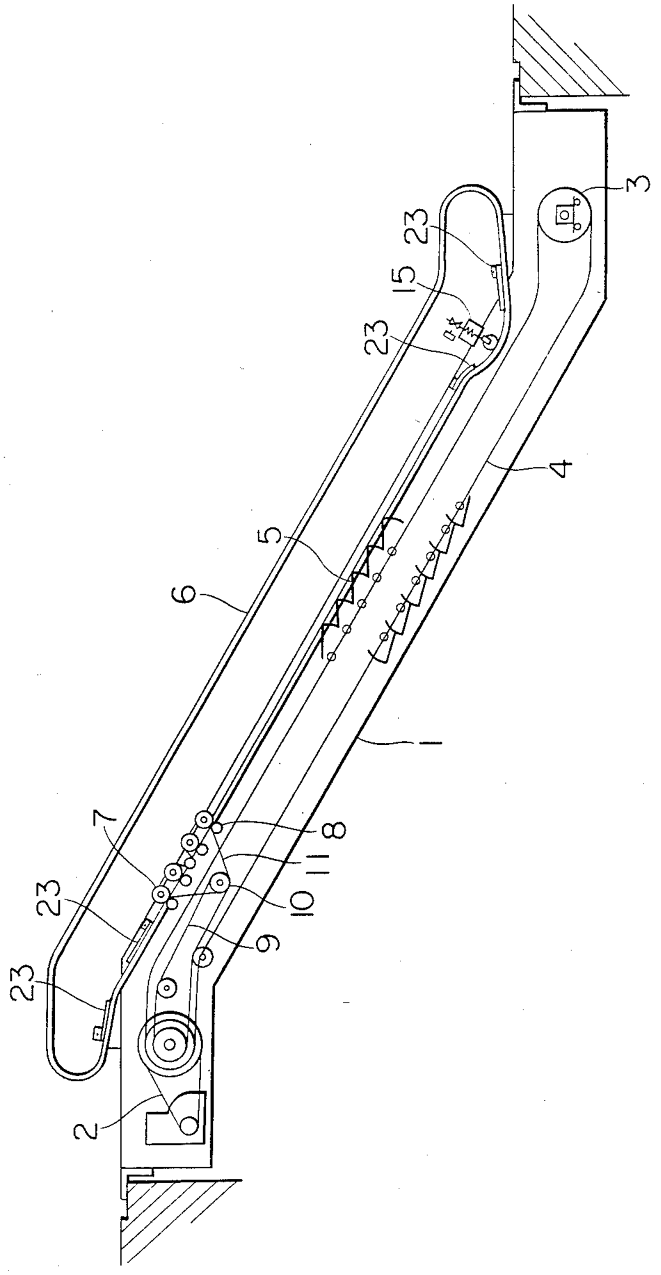
FIG. 2 is a schematic side elevation of a passenger conveyor in which one embodiment of the safety device in accordance with the present invention is provided.

Referring now to FIG. 2 of the accompanying drawings, one embodiment of the present invention is shown together with the passenger conveyor in which the same is provided, with elements similar to those in FIG. 1 being designated by the same reference numerals. A safety device 15 according to the present invention is illustrated as mounted on the upper edge of the main frame 1 near its lower end where a change in slope occurs. As shown more fully in FIGS. 3 and 4, the safety device 15 comprises a thrust means 18 with a support rod 17 on which is rotatably mounted a roller 16 at its free end so as to be able to abut against the handrail 6, a stationary member 19*a* with a channel-shaped bracket 19 which is fixedly secured to the main frame 1 and supports the support rod 17 so that the rod is longitudinally shiftable, a tension application means 20 with a compression spring disposed between the flange 17*a* secured to the support rod 17 and the flange of the bracket 19, an actuating means 21 provided at the base end portion of the support rod 17, and a detecting means 22 such as a limit switch secured to the bracket 19 and adapted to be operated by the displacement of the actuating means 21.

Figure 3:
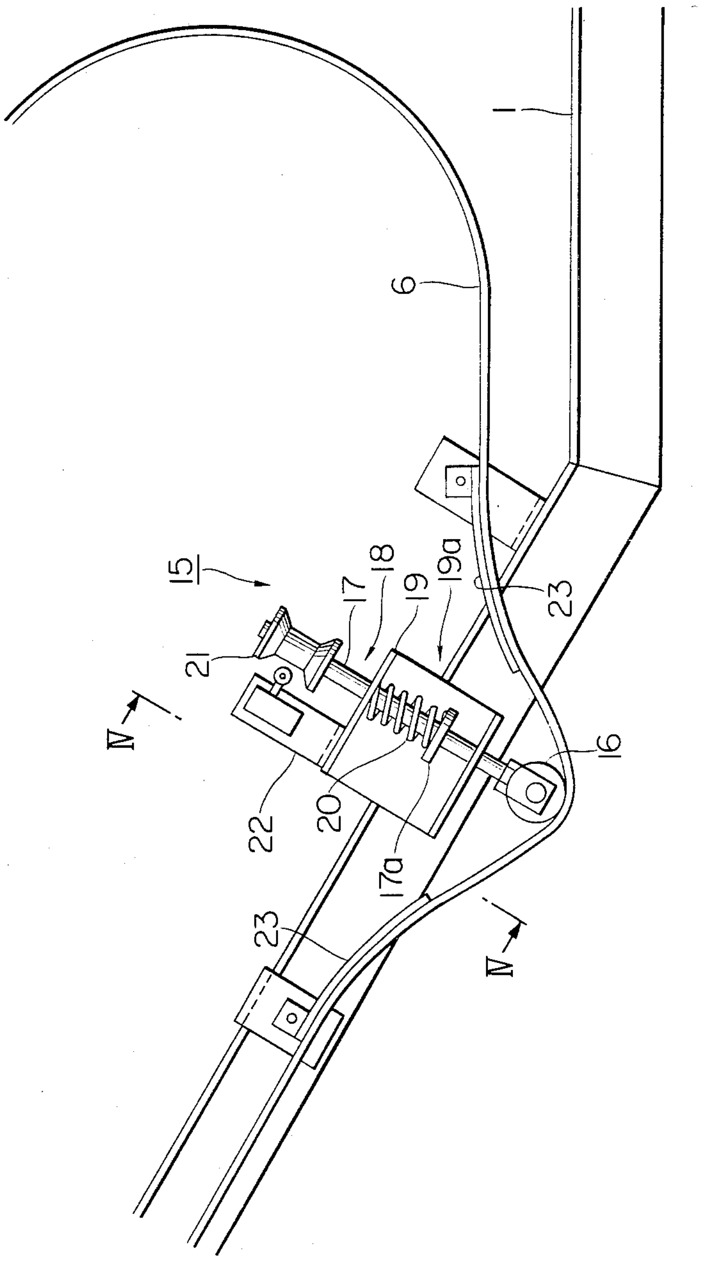
FIG. 3 is a view similar to FIG. 2, but illustrating a principal portion of the safety device on a larger scale.
Figure 4:
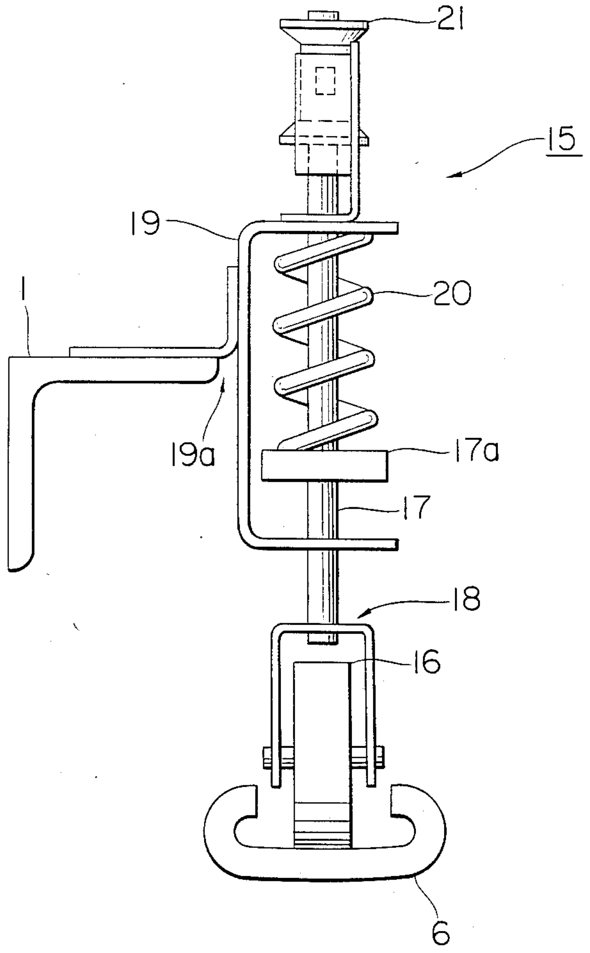
FIG. 4 is a cross sectional view of the safety device shown in FIG. 3 taken along the line IV—IV of FIG. 3.

As shown in FIG. 3, the main frame 1 swingably mounts at the position where the handrail 6 comes in contact with the roller 16 of the support rod 17 two curved lengthwise extending guides 23, each arranged along the handrail 6, and having at their base end portions remote from the roller 16 mounting means such as pivots, the free ends of the guide rails 23 confronting each other with a space between the two with the roller 16 located therebetween. Another set of similarly constituted guide rails 23 are provided at the upper portion of the upper edge of the main frame near the point where a change in slope occurs, as shown in FIG. 2.

The operation of the safety device 15 having a constitution such as described above is as follows.

In the case where the handrail 6 abnormally elongates or is broken, the support rod 17 is thrust towards the handrail 6 by the elastic force of the spring of the tension application means 20, displacing the actuating means 21 in the same direction which results in the operation of the detecting means 22 to stop the passenger conveyor.

Further, since the guide rails 23 are pivoted at their base end portions to the main frame 1 they can follow the handrail 6 even when it is stressed. Even if there arises a situation such that the movement of the handrail 6 only is obstructed at the entrance and/or exit portion of the handrail 6, the support rod 17 is forced to be shifted against the force of the spring of the tension application means 20, operating the detecting means 22. Thus, the safety device 15 can also detect such an abnormal situation.

Although in the embodiment described above and illustrated in the figures the support rod 17 has been referred to as being urged towards the handrail 6 by means of the action of the spring of the tension application means 20, similar operation and effects can be realized also when a weight is utilized in place of the spring.

From the foregoing it will be appreciated that since in the present invention the safety device comprises a support rod shiftably held by a stationary member i.e. the bracket, and adapted to have its forward end abut against the handrail, a tension application means to apply tension to the handrail through the support rod, and a detecting means to detect the shift of the support rod, a lag in the speed of the handrail due to its elongation, etc. can be easily detected.

Furthermore, this device can also serve as a tension mechanism to apply tension to the handrail, making the overall construction of the passenger conveyor simpler.

While a few embodiments of the present invention have been described and illustrated herein, it will be understood that modifications may be made without departing from the present invention.

What is claimed is:

1. A safety device for a passenger conveyor having a main frame, sprockets at the upper and lower parts of the main frame, endless tread board chains reeved on said sprockets, tread boards connected to said endless tread board chains, endless handrails loosely circulatingly driven along with said tread boards, a driving means for said endless board chains, and handrail driving rollers driven by said driving means and frictionally engaging said handrails in frictional contact for driving said handrails, said safety device comprising:

a stationary member on said main frame;

thrust means corresponding to each of said handrails and shiftably held on said stationary member and having the forward end portion directed toward and engaging the inside of the corresponding one of said handrails;

a tension application means engaged with said thrust means for applying tension to said one of said handrails through said thrust means;

a detecting means engageable by said thrust means for detecting a shift of said thrust means beyond predetermined limits; and a pair of guide means on said main frame and extending along the inside of said one of said handrails on opposite sides of said thrust means and being curved concavely outwardly of said stationary member for positively guiding said one of said handrails therealong, and having free ends spaced from each other and the said one handrail being bent freely between said free ends with said forward end portion of said thrust means engaging the bent portion of the one handrail between said free ends, and said free ends being freely movable toward and away from each other with changes in tension in said handrail, whereby said thrust means is positively shifted even for a minor change in the tension of said handrail and any shift of said thrust means beyond the predetermined limits is surely detected.

2. A safety device as claimed in claim 1 in which said guide means each has mounting means mounting the end remote from said thrust means pivotally on said main frame.

3. A safety device as claimed in claim 1 wherein said thrust means comprises a support rod and a roller rotatably mounted at the forward end of said support rod, said support rod being shiftably supported by said main frame, and said tension application means being a compression spring for urging said roller against said one of said handrails.

* * * * *